United States Patent [19]

Smith et al.

[11] Patent Number: 4,496,957
[45] Date of Patent: Jan. 29, 1985

[54] OPTICAL DISK

[75] Inventors: Thomas W. Smith, Penfield, N.Y.; David Cheng, Palo Alto, Calif.; Anthony T. Ward, Webster, N.Y.

[73] Assignee: Xerox Corporation, Stamford, Conn.

[21] Appl. No.: 54,204

[22] Filed: Jul. 2, 1979

[51] Int. Cl.³ .............................................. G01D 15/34
[52] U.S. Cl. ................................ 346/135.1; 346/76 L; 430/945
[58] Field of Search ................... 346/76 L, 135.1, 1.1; 430/540, 21, 346, 945

[56] References Cited

U.S. PATENT DOCUMENTS

| | | | |
|---|---|---|---|
| 3,314,073 | 4/1967 | Becker | 346/76 L |
| 3,526,542 | 9/1970 | Wiese | 430/540 |
| 3,696,344 | 10/1972 | Feinleib | 365/127 |
| 4,032,691 | 6/1977 | Kido | 346/76 L X |
| 4,069,487 | 1/1978 | Kasai | 346/76 L |
| 4,097,895 | 6/1978 | Spong | 346/135.1 X |
| 4,101,907 | 7/1978 | Bell | 346/135.1 |

FOREIGN PATENT DOCUMENTS 24556  7/1971  Japan ............................... 346/135.1

Primary Examiner—Joseph W. Hartary

[57] ABSTRACT

An optical recording member is prepared by coating a thin layer of a colloidal dispersion, of minute particles of certain transition metals or their oxides in a polymeric binder, onto a substrate. The optical recording member may be made to achieve anti-reflecting conditions at the marking wavelength by making the substrate reflective and by using proper thickness for the dispersion layer.

5 Claims, 5 Drawing Figures

OPTICAL DISK

BACKGROUND OF THE INVENTION

This invention relates to a novel optical information recording member, to methods for preparing such a member, and to methods for recording and retrieving information from such a member.

It is known in the prior art to construct an optical recording member, to optically record information on such a member, and to optically recover information from such a member. In Landwer U.S. Pat. No. 3,825,323, there is disclosed a "laser writing" or recording process used to generate a memory by localized melting of selected areas along recording tracks in the surface of a thermo-plastic film. In such a process, the laser beam is selectively focused on the surface of a moving film to cause minute melted depressions in the surface of the film. In recording binary data on such an optical recording member, the melted depressions and areas with no melts correspond to the bits of information 1's and 0's. Such recorded information can be optically read out later by various known means. Due to the extremely small size of the focused laser beam which is used, a very large amount of information can be recorded on a given area of such an optical recording member. For example, Landwer reports that over four million individual bits of binary data have been recorded per square inch or record surface. It is clear that such a memory device for information has great utility.

In Spong, U.S. Pat. No. 4,097,895, there is disclosed a multilayer optical record which is made of a glass substrate, a thin reflective layer of metal, and a topcoat of an organic dye. An information track may be formed on the surface of such an optical record by exposing it to a laser beam which is controlled in accordance with the information to be recorded. The information track is composed of a series of spaced pits formed by the varporization of the organic dye in the areas exposed to high intensity beam. Similarly, in Bloom et al U.S. Pat. No. 4,023,185, other organic dyes useful in ablative optical recording medium are disclosed.

Since the laser or writing instrument must melt or ablate the active layer in such an optical recording member to form a melted depression or a pit in such active layer to record a bit of information, it is clear that the size of the laser apparatus required as well as the amount of energy consumed per bit depends on the nature of the materials which make up the active layer as well as the thickness of that layer. For example, the active layer should have a high absorbance at the wavelength of the laser beam. The active layer should also be as thin as possible to minimize the amount of energy required for ablation. Other factors to be considered in determining the materials to be used in the active layer include ease of handling and fabrication, stability before and after information has been recorded on the recording member, and that those materials be inexpensive, readily available, and economical to use in the fabricating process. Accordingly, there is a need for improved optical recording members of the type indicated above.

SUMMARY OF THE INVENTION

It is an object of the present invention to provide a novel optical recording member, and the methods for making it, and for using it, which is relatively inexpensive to make, stable in handling and storage, sensitive to the beams from presently available laser apparatus, and capable of being manufactured at the high quality necessary for optical information storage purposes. These and other objects of the present invention will be apparent from the following disclosure.

In accordance with the present invention, an optical recording member is provided which, in one embodiment, comprises a supporting substrate having coated thereon a thin layer of a colloidal dispersion of minute particles of a metal, or its oxide, in a polymeric binder material. The term "metal" as used herein is defined as any of the transition metals or elements shown in the Periodic Chart of elements except the metals in group IIIB. The novel optical recording member may be protected on either or both sides by a protective layer. The protective layer on top of the dispersant layer should be transparent to the writing and reading laser beams. Preferably, the thin dispersant layer should be of a thickness to achieve anti-reflecting conditions at the marking wavelength.

DETAILED DESCRIPTION OF THE INVENTION

Figure 1:
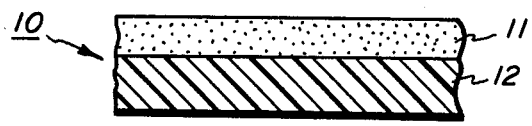
FIG. 1 is a cross-sectional view of one embodiment of the optical recording member of the present invention.

Referring to FIG. 1, an optical recording member 10 in accordance with the present invention is shown to be composed of two layers: a support or substrate 12 and an active layer 11 thereon which is a thin layer of a colloidal dispersion of minute particles of a metal or its oxide in a polymeric binder material. The minute particles of the metal or its oxide is substantially uniformly distributed throughout layer 11. Although layer 11 may be of any thickness, for reasons of economy and other advantages to be discussed herein below, it is preferred that layer 11 be about 1 micron or less in thickness. Typically, the layer 11 may be about 1000–5000Å or less. When no further supporting layers are employed, layer 12 must serve the function of a support to impart to the optical member 10 the requisite structural rigidity and to protect the active layer 11 from damage. It is an important function of the substrate 12 that it furnishes a relatively smooth and adherent surface on which the active layer 11 may be deposited. Examples of materials which can be used for substrate 12 include glass, metals, and the various polymeric materials such as plexiglass, polycarbonate, polypropylene, and various acrylic resins. Generally, substrate 12 may conveniently be made about 1 millimeter in thickness, but this is not critical.

Although it is known to make an optical recording medium which has an active layer consisting of a film of a single component material, such as the thermoplastic film disclosed in the Landwer patent or the thin layer of an organic dye disclosed in the Spong patent, heretofor an optical recording member having an active layer which is made of a colloidal dispersion of an energy-absorbing component in a polymeric binder material is not known. This may be due in part to the fact that an optical recording member of the type disclosed herein must be sensitive to a laser beam focused on an extremely small area of the optical recording member. Because of the small size of the marks made by the laser beam on the optical recording member, a dispersed active layer must have extremely fine particles of the energy absorbing component dispersed substantially uniformly in the layer. For example, if a mark is of micron size or even submicron size, the energy absorbing particles must be substantially smaller than that in order that a mark made by the laser beam be not carried over into neighboring areas by the large particles present. The difficulty in uniformly dispersing very small or fine particles in a viscous medium is well known. When particles of micron size or submicron size are to be uniformly dispersed in a polymeric binder material, the difficulty in carrying out the dispersion efficiently and economically is clear. We have found that an optical recording member having an active layer which is made of a colloidal dispersion of a metal or its oxide in a polymeric binder material can be made by forming the particles of the metal or its oxide in situ in the polymeric binder material. The method involves the decomposition of a metal carbonyl, for example $Fe(CO)_5$, to elemental iron particles or iron oxide particles in a suitable polymer domain. The iron or iron oxide particles obtained generally have a size in the range of about 20-200 Å, although different sized particles can be obtained. For the purposes of the present invention, the metal or its oxide particles should be about 20-500 Angstroms in size, preferably 20-150 Å.

The relative proportion of the energy absorbing metal or its oxide particles to the polymeric binder material can be varied, although sufficient amount of the energy absorbing particles should be present to insure efficient use of the laser beam in the marking process. Generally, we have found that about 50 to 80 weight percent of the metal or its oxide in the polymeric binder material may be used, with 60 to 70 weight percent preferred. However, efficient use of the energy of the laser beam is obtained at the highest amount of metal or oxide in the dispersion.

As indicated above, the term "metal" as used herein denotes any of the transition metals shown in the Periodic Chart of Elements except those in Group IIIB. Examples of such transition metals are iron, cobalt, titanium, silver, nickel, cadmium, etc. The transition metals can be formed into colloidal dispersions by the locus control method which involves the reduction of the metal carbonyl, as indicated above. Other methods for dispersing such metal or oxide particles may also be used to form the optical recording member of the present invention.

Figure 2:
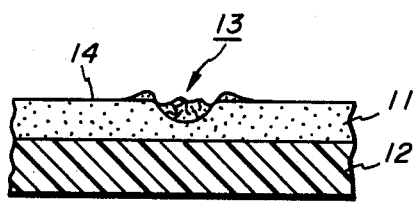
FIG. 2 is a cross-sectional view of a mark made on the optical recording member of FIG. 1.

The optical recording member of the present invention can be made in the form of several distinct structural embodiments. The particular structure selected depends on the mechanism for reading out the information contained in the marks made by the writing laser, as well as the amount of protection afforded the active or dispersed layer. If the reading laser and its associated devices operate on the difference in contrast between marked areas and unmarked areas without the need for a reflective layer, then the structure described above in connection with FIG. 1 may be used. When an optical recording member having the structure shown in FIG. 1 is marked by a writing laser, the resultant mark is illustrated in FIG. 2. In FIG. 2, a mark 13 has been made by a writing laser in the active or colloidal dispersion layer 11. The mark 13 may be generally in the form of a hole or crater, which may or may not be as deep as the entire thickness of layer 11, depending on the thickness of layer 11 employed and the laser power applied as well as other factors. Although the detailed mechanism of making a mark is not completely understood, it is believed that when the laser beam is applied to make the mark 13, the energy from the laser beam is primarily absorbed by the metal or oxide particles dispersed in layer 11 and the energy is only absorbed to a very minor extent by the polymeric binder material itself. It is believed that the energy absorbed by the metallic particles is then transfered to the polymeric binder material and there causes melting and decomposition. The decomposition of a polymeric binder material is generally accompanied by the release of gaseous decomposition products. The attempted escape of such gaseous decomposition products from the interior of layer 11 causes holes or craters to be formed. Such an ablative action often is explosive, particularly when layer 11 is not covered by a protective layer on top, and may cause some ablated materials to be deposited on the edge of the hole or mark in the form or a rim. When a minimum amount of marking energy is used, the disturbance in layer 11 results from melting and the escape of a small amount gaseous decomposition products but the melted materials re-solidifies in the hole with the formation of irregular surface areas. Under microscopic examination, the mark 13 can be seen as a mass of irregular surfaced material, mostly in the hole or mark but with some overflow into the surrounding areas. When a reading laser beam is directed to the mark 13, the irregular surfaces of the mark causes a scattering of the beam with relatively little reflectivity. The unmarked areas 14 may have relatively low reflectivity, say 10% to 30%, but in comparison to the mark 13, that amount of reflectivity will be sufficient to cause areas 14 to appear bright and the mark 13 dark. In this manner, an optical reading apparatus can detect a difference in contrast of the reflected radiation and read out the information represented by the mark 13. In such an optical recording member as shown in FIG. 1, the contrast for reading out the recorded information is provided by layer 11, and the thickness and the nature of the material making up substrate 12 are not critical. Generally, we prefer to make substrate 12 about 1 millimeter in thickness, although a thicker or thinner substrate may be used. Examples of the materials which can be used as substrate 12 include glass, plexiglass, and aluminized-glass, as well as various polymeric materials such as polymethylmethacrylate and polycarbonates, etc.

Figure 3:
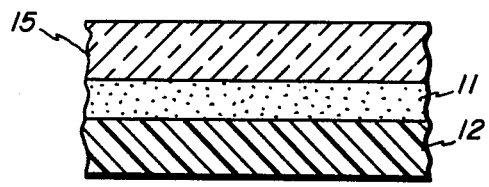
FIG. 3 is a cross-sectional view of another embodiment of the optical recording member of the invention.

Since each mark made on the optical recording member is to be about one micron or less in size, a single piece of dust particle on the top surface of layer 11 may occupy the area intended for thousands of marks. Thus, the optical recording member must be kept substantially dust free. Since it would be difficult and inconvenient to totally exclude the presence of dust and other foreign particles from the surface of layer 11, particularly when the optical recording member is in active use, a protective layer or substrate 15 may be provided on top of layer 11 to separate dust or other particles from layer 11. An optical recording member with a protective substrate 15 thereon is shown in FIG. 3. Protective layer 15 can be made of any material which is transparent to the laser beams used in reading and writing on the optical recording member. Examples of materials which can be used for layer 15 include glass, plexiglass polymethylmethacrylate, polycarbonates, polyesters, etc. Since the laser beam is in a sharply convergent stage at the top surface of protective layer 15, any dust particles thereon would be out of focus with respect to the laser beam and thus not affect the reading or writing process on layer 11. Protective substrate 15 may be of any convenient thickness, for example 1 mm, but it should be at least 0.6 mm thick to insure that foreign particles on top thereof would be out of focus with respect to the plane of the active layer 11.

Figure 4:
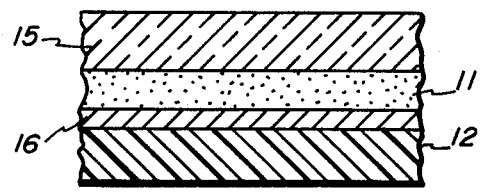
FIG. 4 is a cross-sectional view of a further embodiment of the optical recording member of the invention.

To minimize the amount of energy required to make a mark, as well as to minimize the size of the laser apparatus required, it is desirable to so construct the optical recording member of the present invention to obtain anti-reflecting conditions. In this respect, anti-reflecting conditions are achieved when the maximum amount of the writing laser energy is utilized in the active layer 11 to make the mark. To achieve such anti-reflecting conditions, the layer 11 should be provided with a highly reflective substrate so that any incident writing laser beam which may have penetrated layer 11 would be reflected back into the layer and be dissipated therein. An example of such a highly reflective substrate is aluminum, as contrasted with a transmissive substrate such as glass or an absorbent substrate such as some of the polymeric materials. To obtain the anti-reflecting conditions, the thickness of layer 11 should be calculated via the classical simulation routines of ellipsometry. U.S. Pat. No. 4,097,895 illustrates such a calculation. An embodiment of the optical recording member of the present invention in which anti-reflecting conditions are achieved is illustrated in FIG. 4. In FIG. 4, the active layer 11 is overcoated with a protective substrate 15 on one side and backed by a reflective layer 16 on the other side. A substrate 12 may be optionally provided on the bottom side of reflective layer 16, to provide protection for layer 16 as well as to further impart structural strength to the optical recording member. As indicated above, the reflective layer may be made of such highly reflective materials as aluminum or other metals or aluminized glass. The thickness of the reflective layer 16 may be varied, but for practical purposes, may be a fraction of a micron thick, for example 2,000 Angstrom units or less. The thickness of layer 11 must be calculated for the particular materials used in order to obtain anti-reflecting conditions. For many materials, this thickness is roughly one fourth the wavelength of the marking laser beam, but this rough estimate does not hold true for a wide variety of absorbing layers.

A specific example of an optical recording member having the structure shown in FIG. 4 was made which had a 1 mm thick layer of polymethylmethacrylate (PMM) as the protective substrate 15. Onto the PMM layer was coated an iron oxide dispersion layer of 2800 Å thickness. The iron oxide was dispersed in a copolymer of styrene/butadiene. A 2000 Å thick aluminum layer was provided on the iron oxide dispersion layer, and a 1 micron layer of polymer was coated onto the back of the aluminum layer.

This optical recording member was found to have minimum reflectivity for radiations from a helium-cadmium laser at a wavelength of 4416 Å and from a gallium-arsenide laser at a wavelength of about 8200 Å. In addition, this optical recording member has a maximum reflectivity for radiation from a helium-neon laser at a wavelength of 6328 Å.

Another specific example of an optical recording member having the structure shown in FIG. 4 was made with a 1 mm thick layer of polymethylmethacrylate (PMM) as the protective substrate 15. Onto the PMM layer was coated an iron oxide dispersion layer of 4400 Å thick. The iron oxide was dispersed in a copolymer of styrene/butadiene. A 2000 Å thick aluminum layer was provided on the iron oxide dispersion layer and a one micron layer of polymer was coated onto the back of the aluminum layer. The minimum reflectivity, of less than 5 percent, for this optical recording member occurred at 5145 Å. A maximum reflectivity, of over 40 percent, for this optical recording member occurred at about 6000 Å. The marking threshold for this optical recording member was particularly low, at about 0.13 nanojoule.

The construction of an optical recording member which achieves anti-reflecting conditions can be further coupled to a consideration of the apparatus to be used for the writing and reading operations. For example, when a 1500 Angstrom thick iron or iron oxide dispersion is coated on an aluminum reflective layer, a plot of the reflectivity of such a device against the wavelength of the incident radiation at a 8° incidence angle, a curve is obtained which shows a minimum reflectivity for radiation of about 4400 Angstroms and the maximum reflectivity of between 60 to 65 percent for incident radiations having a wavelength between 6,000 to 7,000 Angstroms. For such an optical recording member, it would be advantageous to write with a helium-cadmium laser which has a wavelength of about 4416 Angstroms, and to read out the information with a helium-neon laser which has a wavelength of about 6328 Angstroms. This is so because such an optical recording member has about 10 percent reflectivity for the radiation from a helium-cadmium laser and thus substantially all of the incident energy is absorbed and used in the marking process. On the other hand, when the helium-neon laser is used to read out the information from such an optical recording member, the high reflectivity of the unmarked area would help to provide good contrast between marked and unmarked areas, as well as to permit the use of lower powered reading laser apparatus. The use of two different lasers for the writing and reading operations for such an optical recording member would thus result in a high operating efficiency for the system at a cost in the amount of equipment needed.

An anti-reflecting optical recording member of the present invention may be used in an apparatus in which a single laser is used for both writing and reading. For example, with an optical recording member which is made of a layer of 2600 Angstroms of iron dispersion coated on an aluminized glass substrate, the initial reflectivity was about 29 percent. This reflectivity dropped to less than 20 percent after the application of a marking energy of about 0.7 nanojoule. The laser used was argon-ion type with a wavelength of 5145 Angstroms. For this optical recording member, the same laser can be used for both reading and writing by regulating the amount of energy output of the laser during the different operations.

The information is recorded on the optical recording member 27 in micron-size bits. Typically, the recording member may contain up to $10^8$ bits of information per square centimeter.

When the information recorded on the optical recording member 27 is to be read out, a continuous, low powered beam from laser 18 is directed onto the recording member 27, and thence reflected back through beam splitter 25 into photodetector 32. The signal may be visually displayed on an oscilloscope or the signal may be sent on to the microprocessor 22. The positioning of the optical recording member 27, in both the recording and reading processes, is controlled by the microprocessor, as shown. A separate light source having a wavelength not absorbed significantly by the thin layer 11 can also be used for focusing. Tracking can be achieved by conventional means.

The invention will be further illustrated with the following specific examples.

EXAMPLE I

A colloidal dispersion of iron particles was prepared by charging 500 grams of reagent grade xylene and 20 grams of a hydroxyl terminated styrene/butadiene resin into a one liter four necked round bottom flask equipped with a stirrer, a thermometer, a reflux condenser, gas inlet and a serum cap for the introduction of iron carbonyl $Fe(CO)_5$. The mixture was heated in an oil bath maintained at a temperature of 158° C. until the reaction mixture reached a temperature of about 135°–137° C. The mixture was azeotropically dried under an argon blanket and held at 135° C. overnight while the system was purged with argon. 100 millimeters (142.7 grams) of $Fe(CO)_5$ were added in twenty-five ml increments over a period of 8 days. The reaction mixture was held at about 135–137° C. and an inert atmosphere was always maintained in the flask.

Following the completion of the thermolysis, as determined by the absence of CO peaks in the infrared analyzer, the dispersion was pressure filtered under argon through a 2–4 micron filter and stored in a serum bottle under argon. The yield of iron particles was 7.0 percent by weight while the non-volatile component in the mixture was 12.0 percent by weight. The diameter of the dispersed particles was about 60–80 Angstroms.

The colloidal dispersion of iron or iron oxide was then spin coated onto several substrates. The substrates were 2 inch by 2 inch glass, plexiglass and aluminized glass. The film thickness was controlled by varying spinning rate and coatings of 6,000 and 5,000 Angstroms thick were obtained. The films were fabricated in either a "clean room" or in a laminar flow hood. It is believed that the elemental iron particles quickly oxidized to iron oxide during or shortly after the spin coating process.

Figure 5:
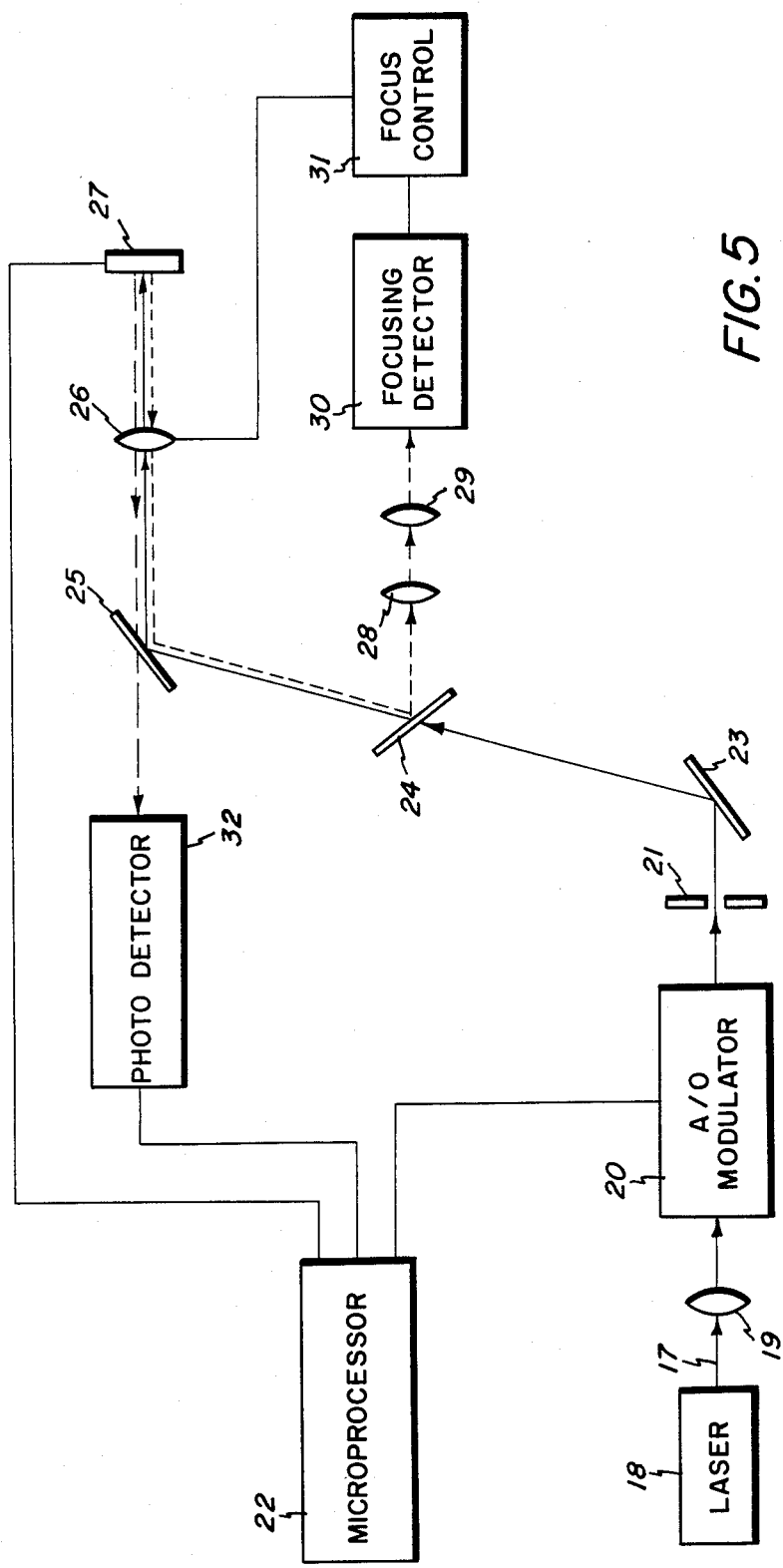
FIG. 5 is a block diagram of a system for recording and retrieving information from an optical recording member of the invention.

The coated substrates were kept clean until ready to use. The apparatus for using the coated substrates was essentially as shown in FIG. 5. A minicomputer was used as a controller and an externally modulated argon-/ion laser was used as the write and read instrument. The laser was operated at 5145 Angstroms with a maximum power of 30 mW focused to a 0.71 micron spot on the recording sample which was mounted on an xyz stage. The stage movement is driven by stepping motors which are controlled by the computers to locate a sight on the sample to within 1.25 micron step size. Micron sized marks and submicron sized marks were made on the film depending on the pulse energy applied. These marks had good contrast and were easily read out. The energy threshold was less than one nanojoule (nj) and the threshold energy density was less than two nj/micron squared.

EXAMPLE II

The procedure of Example I was repeated except that the dispersion was coated at the thicknesses of 2850 Angstroms and 5800 Angstroms on glass substrate. The elemental iron was believed to have been completely oxidized within 48 hours. Marks were again made on the samples and read outs obtained. The energy threshold and energy density threshold for these samples were generally similar to those obtained in Example I.

EXAMPLE III

The procedure of Example I was repeated except that the amount of $Fe(CO)_5$ employed was increased by 50 percent. It was found that the amount of iron in the colloidal dispersion obtained did not increase proportionately, and only 7.9 percent iron by weight was found in the mixture. However, the particle size have increased and they range from about 50–150 Angstrom units. This dispersion was coated on the substrates as before at a thickness of 5,000 Angstroms and 2100 Angstroms. The energy threshold and the energy density threshold for these samples were found to be considerably lower than the samples of Examples I and II. The energy threshold for these samples were between about 0.25 to 0.35 nj while the energy density thresholds for these samples were all below 1 nj/micron square.

Upon examination of the different samples marked with different amounts of pulse energy, it has been found that the greatest readout contrast is obtained when about 1.5 to 2.5 nj was applied to make the mark.

EXAMPLE IV

A colloidal dispersion of cobalt or cobalt oxide particles was prepared, essentially according to the procedure of Example I. 500 grams of reagent grade decahydronaphthalene and 20 grams of a hydroxyl terminated styrene/butadiene resin were charged into a one liter four necked round bottom flask equipped with a stirrer, a thermometer, a reflex condenser, gas inlet and a serum cap for the introduction of dicobalt octacarbonyl, $Co_2(CO)_8$. This mixture was heated in an oil bath maintained at a temperature of 158° C. until the reaction mixture reached a temperature of about 140° C. under an inert atmosphere. 21 grams of dicobalt octacarbonyl was dissolved in 100 grams of decahydronaphthalene and added to the reaction mixture in 20 increments over a period of 6 days, while the reaction mixture was held at about 140° C. under an inert atmosphere.

Following the completion of the thermolysis, the dispersion was pressure filtered under argon through a 2–4 micron filter and stored in a serum bottle under argon. The yield of cobalt particles was 5.9 percent. The diameter of the dispersed particles was about 50 to 100 Angstroms. The colloidal dispersion of cobalt or cobalt oxide was then thin coated onto several substrates. The film thickness was controlled by varying spin rate and coatings of 500 to 1000 Angstroms thick were obtained. It is believed that the elemental cobalt particles eventually oxidized to cobalt oxide after the spin coating process.

The coated substrates were marked with a tunable dye laser at a wavelength of 4416 Angstroms, focused to a 0.4 micron spot. Marks were made on the film which were readily read out.

While the invention has been described in detail with reference to specific preferred embodiments, it will be appreciated that various modifications may be made from the specific details without departing from the spirit and scope of the invention.

What is claimed is:

1. An optical recording member for optically recording and retrieving of information thereon comprising:
   a substrate having coated thereon a thin layer of a colloidal dispersion of minute particles of a metal or its oxide in a polymer binder, said metal being a transition metal element of the Periodic Chart except those of Group IIIB of said Chart, said minute particles being about 20 to 150 angstroms in size, said thin layer being ablatable to form micron sized information containing marks thereon,
   a protective layer on said thin layer, said protective layer being substantially transparent to writing and reading optical radiation for said optical recording member.

2. An optical recording member for optically recording and retrieving of information thereon comprising:
   a substrate having coated thereon a thin layer of a colloidal dispersion of minute particles of iron or iron oxide in a polymeric binder, said polymeric binder being a copolymer containing sytrene, said thin layer being ablatable to form micron sized information containing marks thereon,
   a protective layer on said thin layer, said protective layer being substantially transparent to writing and reading optical radiation for said optical recording member.

3. An optical recording member for optically recording and retrieving of information thereon comprising:
   a substrate having coated thereon a thin layer of a colloidal dispersion of minute particles of cobalt or its oxide in a polymeric binder, said polymeric binder being a copolymer containing styrene, said thin layer being ablatable to form micron sized information containing marks thereon,
   a protective layer on said thin layer, said protective layer being substantially transparent to writing and reading optical radiation for said optical recording member.

4. An optical recording member for optically recording and retrieving of information thereon comprising:
   a substrate having coated thereon a thin layer of a colloidal dispersion of minute particles of nickel or its oxide in a polymeric binder, said polymeric binder being a copolymer containing styrene, said thin layer being ablatable to form micron sized information containing marks thereon,
   a protective layer on said thin layer, said protective layer being substantially transparent to writing and reading optical radiation for said optical recording member.

5. An optical recording member for optically recording and retrieving of information thereon comprising:
   a reflective substrate having coated thereon a thin layer of a colloidal dispersion of minute particles of iron or iron oxide being about 20 to 150 angstroms in size, said thin layer being about 1,000 to 6,000 angstroms to obtain anti-reflecting conditions at the marking wavelength and reflecting conditions at the reading wavelength,
   a protective layer on said thin layer at least 0.6 mm thick and substantially transparent to writing and reading optical radiation for said optical recording member.

* * * * *